United States Patent
Lambert et al.

(10) Patent No.: US 9,047,599 B1
(45) Date of Patent: Jun. 2, 2015

(54) METHOD AND APPARATUS FOR WIRELESSLY PROCESSING A FINANCIAL TRANSACTION USING A WIRELESS PAYMENT CARD READER

(71) Applicant: Marvell Interntional LTD., Hamilton (BM)

(72) Inventors: Paul A. Lambert, Mountain View, CA (US); Josselin De La Broise, Palo Alto, CA (US)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 14/195,176

(22) Filed: Mar. 3, 2014

Related U.S. Application Data (60) Provisional application No. 61/772,992, filed on Mar. 5, 2013.

(51) Int. Cl.
*G06Q 20/32* (2012.01)
*G06Q 20/34* (2012.01)

(52) U.S. Cl.
CPC .............. *G06Q 20/322* (2013.01); *G06Q 20/34* (2013.01); *G06Q 20/3226* (2013.01)

(58) Field of Classification Search
USPC ............................................ 235/472.02, 439
See application file for complete search history.

(56) References Cited

U.S. PATENT DOCUMENTS

| | | | |
|---|---|---|---|
| 2013/0124349 A1* | 5/2013 | Khan et al. ...................... 705/21 |
| 2013/0173475 A1* | 7/2013 | Lund ................................ 705/67 |
| 2014/0001264 A1* | 1/2014 | Babu et al. ..................... 235/440 |
| 2015/0006407 A1* | 1/2015 | Lunn et al. ...................... 705/73 |

* cited by examiner

*Primary Examiner* — Christle I Marshall (57) ABSTRACT

A wireless device including a reader to read information from a payment card and generate data. A verification module verifies whether the reader has correctly read the information. A security module securely connects the wireless device to a mobile device using a first or a second wireless communication protocol. A transmitter transmits the data and identifying information received from a user to the mobile device using the first or the second wireless communication protocol. The mobile device transmits the data and the identifying information to a payment system. A receiver at the wireless device receives from the mobile device an acknowledgement received by the mobile device from the payment system, indicating whether the payment system has approved the data and the identifying information. An indicator on the wireless device indicates whether the reader has correctly read the information and the payment system has approved the data and the identifying information.

15 Claims, 4 Drawing Sheets

METHOD AND APPARATUS FOR WIRELESSLY PROCESSING A FINANCIAL TRANSACTION USING A WIRELESS PAYMENT CARD READER

CROSS-REFERENCE TO RELATED APPLICATIONS

This application claims the benefit of U.S. Provisional Application No. 61/772,992, filed on Mar. 5, 2013. The entire disclosures of the applications referenced above are incorporated herein by reference.

FIELD

The present disclosure relates generally to wireless communications, and more particularly to a wireless reader that can read different types of codes utilized in performing financial transactions.

BACKGROUND

Consumers typically use payment devices including credit cards, debit cards, and gift cards (collectively payment cards) to pay for items purchased at a point of sale. A payment device generally includes financial information of a consumer recorded in the form of a magnetic strip, an optically scannable code (e.g., a bar code or quick response (QR) code), or a near-field communication (NFC) tag. In order to perform a financial transaction (such as a payment for goods), a payment device is typically swiped through a reader that reads the financial information from the payment device.

SUMMARY

A wireless device comprises a reader, a verification module, an input module, a security module, a transmitter, a receiver, and an indicator. The reader is configured to read information from a payment card and generate data based on the information read from the payment card. The verification module is configured to verify, based on the data, whether the reader has correctly read the information from the payment card. The input module is configured to allow a user to enter identifying information of the user in response to the verification module verifying that the reader has correctly read the information from the payment card. The security module is configured to securely connect the wireless device to a mobile device using (i) a first wireless communication protocol or (ii) a second wireless communication protocol. The first wireless communication protocol is different from the second wireless communication protocol. The transmitter is configured to transmit, in response to the verification module verifying that the reader has correctly read the information from the payment card, (i) the data and (ii) the identifying information to the mobile device using (i) the first wireless communication protocol or (ii) the second wireless communication protocol. The mobile device is configured to transmit (i) the data and (ii) the identifying information to a payment system. The receiver is configured to receive from the mobile device, via (i) the first wireless communication protocol or (ii) the second wireless communication protocol, an acknowledgement received by the mobile device from the payment system. The acknowledgement indicates whether the payment system has approved (i) the data and (ii) the identifying information. The indicator is configured to indicate (i) whether the reader has correctly read the information from the payment card, and (ii) whether the payment system has approved the data and the identifying information.

In other features, the reader is configured to read the information from (i) a magnetic strip, (ii) a bar code, (iii) a QR code, or (iv) a near-field communication tag associated with the payment card.

In other features, the first communication protocol includes a Bluetooth communication protocol, and the second wireless communication protocol includes a Wi-Fi communication protocol.

In other features, the indicator includes one or more audio or visual indicators to indicate (i) whether the reader has correctly read the information from the payment card, and (ii) whether the payment system has approved the data and the identifying information.

In another feature, the input module includes a keypad configured to allow the user to enter the identifying information including a zip code, a PIN number, or a password.

In another feature, the input module includes a biometric sensor configured to sense biometric data of the user.

In other features, a system comprises the wireless device and the mobile device. The mobile device is configured to operate as an intermediary between (i) the wireless device and (ii) the payment system.

In other features, the mobile device includes an application program configured to communicate with (i) the wireless device and (ii) the payment system, and the application program is configured to record in the mobile device an item purchased using the wireless device.

In still other features, a method comprises reading information from a payment card using a reader arranged in a wireless device and generating data based on the information read by the reader from the payment card. The method further comprises verifying, based on the data, whether the reader has correctly read the information from the payment card. The method further comprises receiving, from a user of the wireless device, identifying information of the user in response to verifying that the reader has correctly read the information from the payment card. The method further comprises securely connecting the wireless device to a mobile device using (i) a first wireless communication protocol or (ii) a second wireless communication protocol. The first wireless communication protocol is different from the second wireless communication protocol. The method further comprises transmitting, in response to verifying that the reader has correctly read the information from the payment card, (i) the data and (ii) the identifying information from the wireless device to the mobile device using (i) the first wireless communication protocol or (ii) the second wireless communication protocol. The method further comprises transmitting (i) the data and (ii) the identifying information from the mobile device to a payment system and receiving an acknowledgement from the payment system at the mobile device. The acknowledgement indicates whether the payment system has approved (i) the data and (ii) the identifying information. The method further comprises receiving the acknowledgement from the mobile device at the wireless device via (i) the first wireless communication protocol or (ii) the second wireless communication protocol. The method further comprises indicating, using an indicator on the wireless device, (i) whether the reader has correctly read the information from the payment card, and (ii) whether the payment system has approved the data and the identifying information.

In other features, reading the information includes reading the information from (i) a magnetic strip, (ii) a bar code, (iii) a QR code, or (iv) a near-field communication tag associated with the payment card.

In other features, the first communication protocol includes a Bluetooth communication protocol, and the second wireless communication protocol includes a Wi-Fi communication protocol.

In other features, the indicating includes indicating using one or more audio or visual indicators on the wireless device to indicate (i) whether the reader has correctly read the information from the payment card, and (ii) whether the payment system has approved the data and the identifying information.

In other features, the identifying information includes a zip code, a PIN number, or a password entered by the user via a keypad on the wireless device.

In another feature, the identifying information includes biometric data of the user sensed by a biometric sensor on the wireless device.

In another feature, the method further comprises recording at the mobile device, in response to receiving the acknowledgement from the payment system, a purchase made by the reading the information from the payment card.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Generally, a reader that can read financial information recorded on payment devices (e.g., payment cards) in the form of magnetic strips, optically scannable codes, or NFC tags is physically connected to a computing device. For example, a reader can be plugged into a headphone jack of a mobile device (e.g., a smartphones or tablet). Alternatively, a reader can be connected to a laptop computer by a cable. A computing device can process the data generated by a reader when a payment device is swiped through the reader.

The present disclosure relates to a wireless reader that can read financial information recorded in different forms. For example, the wireless reader can read information recorded on a magnetic strip of a credit card, debit card, and gift card (collectively payment cards). The wireless reader can also read information recorded using a barcode and quick response (QR) code. The wireless reader can also read information stored in a near-field communication (NFC) tag.

The wireless reader can communicate with a mobile device using one or more wireless communication protocols. For example, the wireless reader can communicate with a smartphone and/or a tablet via Bluetooth and/or one or more Wi-Fi communication protocols. The mobile device communicates with a payment system (e.g., a payment system managed by a credit card company, a bank, and/or a merchant) via a wireless network.

The mobile device transmits the data read by the wireless reader to the payment system and receives an acknowledgment from the payment system indicating whether a transaction initiated by the wireless reader is approved or disapproved. The wireless reader can include one or more indicators to indicate whether a payment card has been correctly scanned through the wireless reader and whether the transaction is approved or disapproved by the payment system. The mobile device can also provide the one or more indicators, for example, on a display of the mobile device. The mobile device can keep a record of items purchased online, for example, when the wireless reader is used in conjunction with the mobile device to pay for the items purchased online. These and other features of the wireless reader are described below in detail.

Figure 1A:
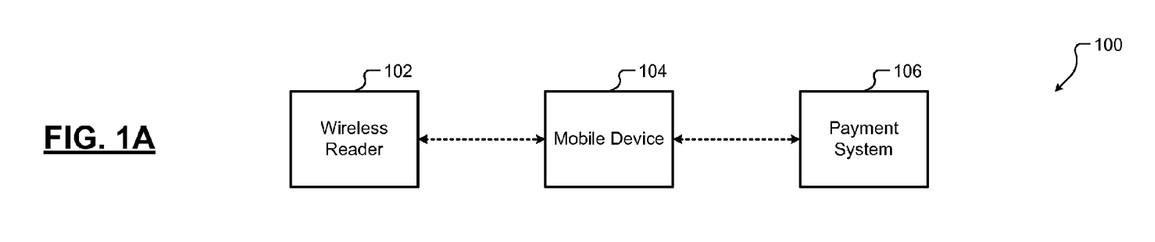
FIG. 1A is a functional block diagram of an example system for making a payment using a credit card.

FIG. 1A shows a system 100 for making a payment using a wireless reader and a mobile device. The system 100 includes a wireless reader 102, a mobile device 104, and a payment system 106. The wireless reader 102 communicates wirelessly with the mobile device 104. The mobile device 104 communicates with the payment system 106 via a wireless network.

The wireless reader 102 may include a reader that can read a magnetic strip of a credit card, a debit card, and/or a gift card, for example. Alternatively, the wireless reader 102 may include a reader that can read a barcode or a QR code. In some implementations, the wireless reader 102 may include a reader that can read an NFC tag. The mobile device 104 may include a smartphone, a tablet, or a laptop computer, for example. The payment system 106 may include a payment system managed by a credit card company, a bank, and/or a merchant, for example.

Figure 1B:
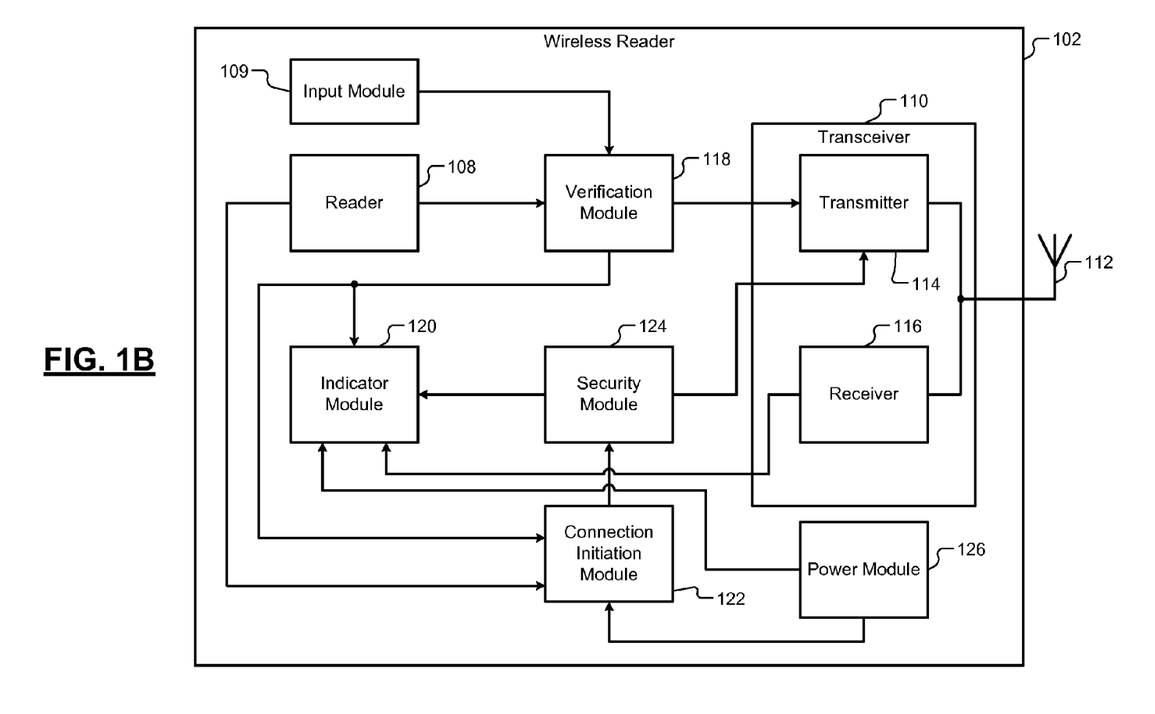
FIG. 1B is a functional block diagram of an example wireless reader that can be used in the system of FIG. 1A.

FIG. 2B shows the wireless reader 102. The wireless reader 102 includes a reader 108, a transceiver 110, and an antenna 112. The reader 108 can read information stored on a magnetic strip of a payment card, a barcode, a QR code, and/or NFC tag and generate data based on the information. The transceiver 110 includes a transmitter 114 and a receiver 116. The transmitter 114 and the receiver 116 respectively transmit and receive data via the antenna 112. While only one antenna is shown, the wireless reader 102 may include a plurality of antennas. The transmitter 114 and the receiver 116 can communicate using one or more wireless communication protocols (e.g., Bluetooth and one or more Wi-Fi communication protocols).

The wireless reader 102 further includes an input module 109, a verification module 118, an indicator module 120, a connection initiation module 122, a security module 124, and a power module 126. The input module 109 may include a keypad and/or a biometric sensor that a user can use to enter identification information when a payment card is swiped through the reader 108, for example. The identification information (e.g., zip code, PIN number, password, and/or fingerprint) can be used to verify the identity of the person presenting the payment card and to verify that the person presenting the payment card is a legitimate owner of the payment card.

The verification module 118 verifies whether a payment card has been properly scanned through the reader 108. In one implementation, the verification module 118 verifies that a payment card has been properly scanned based on the reader 108 having correctly read information stored on a payment card, for example. The indicator module 120 includes one or more audiovisual indicators (e.g., one or more LEDs, a speaker, and/or a vibrator). The indicator module 120 indicates whether the reader 108 has correctly read information from a payment card, for example. A user can decide whether to swipe the payment card again, for example, should the indicator module 120 indicate that the reader 108 has failed to properly read information stored on the payment card. In one implementation, should the reader 108 fail to properly read information stored on a payment card, the input module 109 prompts the user to enter identification information to verify the identity of the user presenting the payment card and to verify that the user presenting the payment card is a legitimate owner of the payment card (e.g., see FIG. 3C and related description below).

The transmitter 114 transmits the data generated by the reader 108 and verified by the verification module 118 along with the identification information entered by the user to the mobile device 104 via the antenna 112 using Bluetooth or Wi-Fi communication protocol. The mobile device 104 transmits the data along with the identification information to the payment system 106 and receives an acknowledgment from the payment system 106 indicating whether the transaction initiated by swiping the payment card is approved or disapproved by the payment system 106. For example, the payment system 106 may approve the transaction if both the data and the identification information are correct, and may disapprove the transaction if either the data or the identification information is incorrect. In some implementations, as explained below, the mobile device can also keep a record of the item purchased by a buyer (i.e., a user of the wireless reader 102 and the mobile device 104).

The mobile device 104 transmits the acknowledgment received from the payment system 106 to the wireless reader 102 using Bluetooth or Wi-Fi communication protocol. The receiver 116 receives the acknowledgment from the mobile device 104 via the antenna 112 using Bluetooth or Wi-Fi communication protocol. The indicator module 120 indicates whether the transaction initiated by swiping the payment card is approved or disapproved by the payment system 106.

Prior to reading information stored on a payment card, for example, the wireless reader 102 can be turned on, and a connection with the mobile device 104 can be initiated as follows. For example, the wireless reader 102 (e.g., the power module 126) may include a switch or a pushbutton that a user can use to turn on the wireless reader 102. In some implementations, the wireless reader 102 can be turned on by swiping a payment card through the reader 108.

The connection initiation module 122 may initiate a connection between the wireless reader 102 and the mobile device 104 when the wireless reader 102 is turned on or when a payment card is swiped, for example. Alternatively, the connection initiation module 122 may communicate with a switch or a pushbutton (e.g., the switch or pushbutton used to turn on the wireless reader or a separate switch or pushbutton) that can be used to initiate a connection between the wireless reader 102 and the mobile device 104.

An application program on the mobile device 104 may be preconfigured and authorized to communicate with the wireless reader 102. When the connection initiation module 122 initiates a connection between the wireless reader 102 and the mobile device 104, the security module 124 may exchange security information (at least a portion of which may be predetermined) with the mobile device 104 via the transceiver 110 and the antenna 112 using Bluetooth or Wi-Fi communication protocol. For example, if Bluetooth communication protocol is used to communicate between the wireless reader 102 and the mobile device 104, the security module 124 may pair the wireless reader 102 with the mobile device 104.

In some implementations, the connection initiation module 122 may initiate the connection between the wireless reader 102 and the mobile device 104 subsequent to the verification module 118 verifying that the reader 108 has correctly read the information on a payment card, for example. The security module 124 may output a signal to the indicator module 120 indicating whether the wireless reader 102 is connected to the mobile device 104. Accordingly, the indicator module 120 can indicate whether the wireless reader 102 is connected to the mobile device 104.

A merchant can use the wireless reader 102 in conjunction with the mobile device 104 as described above to receive payments from a buyer's credit card, for example, when goods or services are sold to the buyer. Alternatively, a buyer can use the wireless reader 102 in conjunction with the mobile device 104 as described above to pay a merchant when buying goods or services from the merchant's website. For example, when a buyer buys an item from a merchant's website, the buyer can pay for the item by swiping the buyer's credit card, for example, on the buyer's personal wireless reader 102. The buyer's personal wireless reader 102 is connected to the buyer's personal mobile device 104.

An application program on the buyer's mobile device 104 communicates with the payment system 106. The payment system 106 approves or disapproves the buyer's purchase of the item based on the data received from the buyer's personal wireless reader 102 and the buyer's personal mobile device 104. If approved, the payment system 106 credits the merchant's account with the purchase price by debiting the purchase price from the buyer's credit card account, for example. The application program on the buyer's mobile device 104 can also keep a record of the item purchased by the buyer.

Figure 2A:
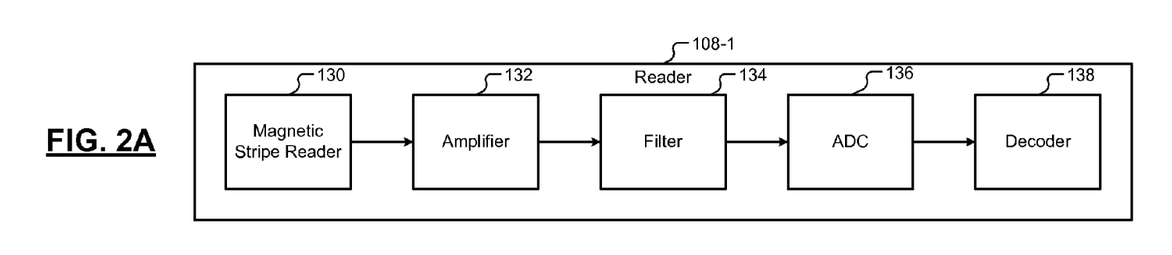
FIGS. 2A-2D show examples of wireless readers that can be used in the system of FIG. 1A.

FIG. 2A shows a reader 108-1 that includes a magnetic strip reader 130, an amplifier 132, a filter 134, an analog-to-digital converter 136, and a decoder 138. The magnetic strip reader 130 can read information from a magnetic strip of the payment card, for example, and generate a read signal. The amplifier 132 amplifies the read signal. The filter 134 filters the output of the amplifier 132. The analog-to-digital converter 136 converts the output of the filter from analog to digital format. The decoder 136 decodes the output of the analog-to-digital converter 136 and generates the data output by the reader 108-1 to the verification module 118.

Figure 2B:
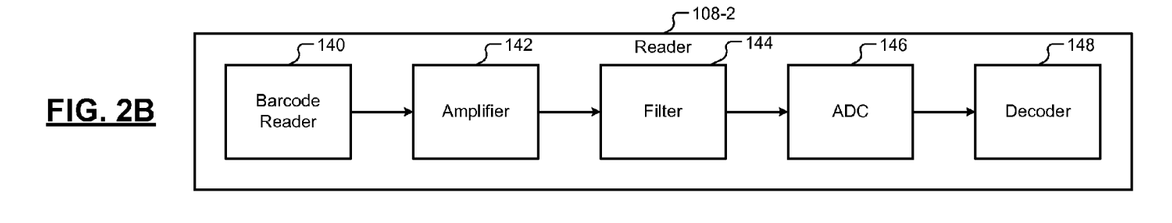

FIG. 2B shows a reader 108-2 that includes a barcode reader 140, an amplifier 142, a filter 144, an analog-to-digital converter 146, and a decoder 148. The barcode reader 140 can read information from a barcode and generate a read signal. The amplifier 142 amplifies the read signal. The filter 144 filters the output of the amplifier 142. The analog-to-digital converter 146 converts the output of the filter from analog to digital format. The decoder 146 decodes the output of the analog-to-digital converter 146 and generates the data output by the reader 108-2 to the verification module 118.

Figure 2C:
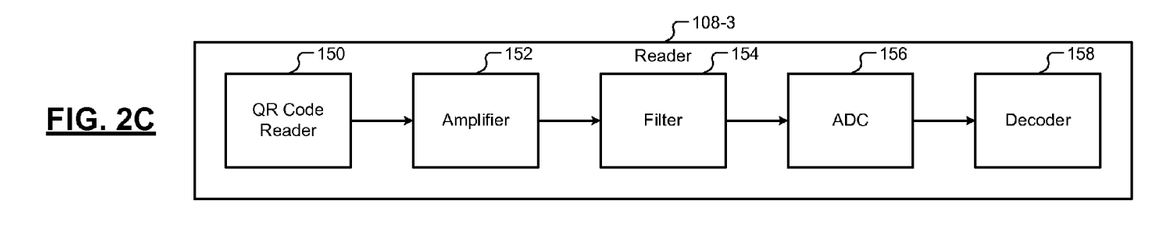

FIG. 2C shows a reader 108-3 that includes a QR code reader 150, an amplifier 152, a filter 154, an analog-to-digital converter 156, and a decoder 158. The QR code reader 150 can read information from a QR code and generate a read signal. The amplifier 152 amplifies the read signal. The filter 154 filters the output of the amplifier 152. The analog-to-digital converter 156 converts the output of the filter from analog to digital format. The decoder 156 decodes the output of the analog-to-digital converter 156 and generates the data output by the reader 108-3 to the verification module 118.

Figure 2D:
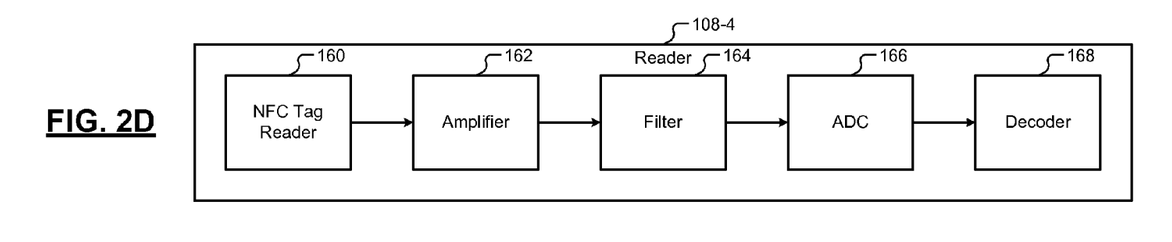

FIG. 2D shows a reader 108-4 that includes an NFC tag reader 160, an amplifier 162, a filter 164, an analog-to-digital converter 166, and a decoder 168. The NFC tag reader 160 can read information from an NFC tag and generate a read signal. The amplifier 162 amplifies the read signal. The filter 164 filters the output of the amplifier 162. The analog-to-digital converter 166 converts the output of the filter from analog to digital format. The decoder 166 decodes the output of the analog-to-digital converter 166 and generates the data output by the reader 108-4 to the verification module 118.

Figure 3A:
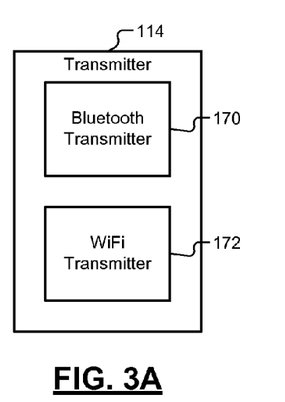
FIGS. 3A and 3B respectively show examples of wireless transmitters and wireless receivers that can be used in the wireless reader of FIG. 1B.

FIG. 3A shows an example of the transmitter 114. The transmitter 114, for example, includes a Bluetooth transmitter 170 and a Wi-Fi transmitter 172. The Bluetooth transmitter 170 transmits data via the antenna 112 using a Bluetooth communication protocol. The Wi-Fi transmitter 172 transmits data via the antenna 112 using a Wi-Fi communication protocol.

Figure 3B:
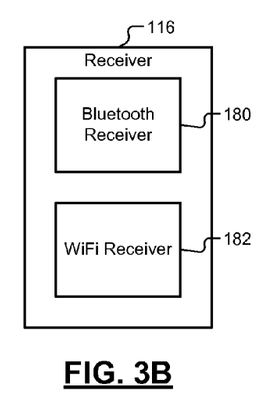

FIG. 3B shows an example of the receiver 116. The receiver 116, for example, includes a Bluetooth receiver 180 and a Wi-Fi receiver 182. The Bluetooth transmitter 180 receives data via the antenna 112 using a Bluetooth communication protocol. The Wi-Fi receiver 182 receives data via the antenna 112 using a Wi-Fi communication protocol.

Figure 3C:
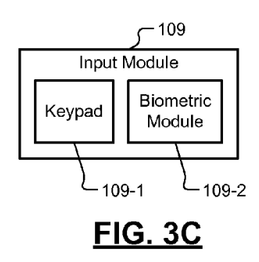
FIG. 3C shows an example input module of the wireless reader of FIG. 1B that can be used to enter personal identification information.

FIG. 3C shows an example of the input module 109. For example, the input module may include a keypad 109-1 and a biometric module 109-2. The keypad 109-1 can be used to enter a personal identification number (PIN), a zip code, and/or a passcode, for example. The biometric module 109-2 may be used to input biometric data (e.g., fingerprint) of the user. Accordingly, the biometric module 109-2 may include a sensor to sense the biometric data.

Figure 4:
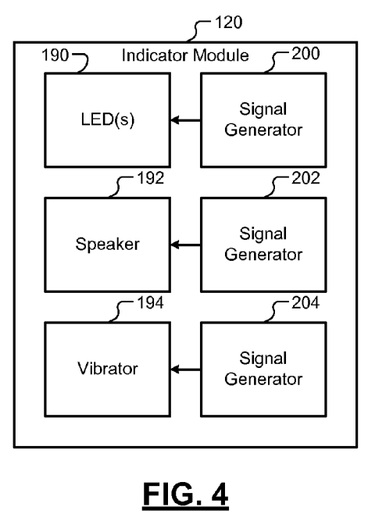
FIG. 4 shows an example of one or more indicators that can be used in the wireless reader of FIG. 1B.

FIG. 4 shows an example of the indicator module 120. The indicator module 120 can include one or more LEDs 190, a speaker 192, and/or a vibrator 194 to indicate different statuses of the wireless reader 102. The indicator module 120 can indicate the statuses based on the inputs received by the indicator module 120 from various modules (e.g., the verification module 118, the security module 124, the receiver 116, and the power module 126) of the wireless reader 102.

For example, the LEDs 190 may receive signals generated by a signal generator 200 based on the inputs received by the indicator module 120 from the various modules (e.g., the verification module 118, the security module 124, the receiver 116, and the power module 126). For example, the LEDs 190 may include a plurality of LEDs of the same color or of different colors to indicate different statuses. For example, one LED of one color may be used to indicate whether the reader 108 has correctly read information stored on a payment card while another LED of another color may be used to indicate whether the payment system 106 approves a transaction.

Alternatively, one or more multicolor LEDs may be used to indicate different statuses by changing color of the one or more multicolor LEDs. For example, a single multicolor LED capable of emitting lights of two different colors may be used, where one color of the single multicolor LED is used to indicate whether the reader 108 has correctly read information stored on a payment card while another color of the single multicolor LED may be used to indicate whether the payment system 106 approves a transaction. Similar or different arrangements may be utilized to indicate whether a connection is established between the wireless reader 102 and the mobile device 104, whether the wireless reader 102 is turned on, and so on.

Alternatively or additionally, the speaker 192 may receive signals generated by a signal generator 202 based on the inputs received by the indicator module 120 from the various modules (e.g., the verification module 118, the security module 124, the receiver 116, and the power module 126). The speaker 192 may produce different sounds (e.g., sounds of different frequencies, amplitudes, and/or durations) to indicate different statuses of the wireless reader 102 based on the inputs received by the indicator module 120 from the various modules.

Alternatively or additionally, the vibrator 194 may receive signals generated by a signal generator 204 based on the inputs received by the indicator module 120 from the various modules (e.g., the verification module 118, the security module 124, the receiver 116, and the power module 126). The vibrator 194 may produce different vibrations to indicate different statuses of the wireless reader 102 based on the inputs received by the indicator module 120 from the various modules.

Alternatively or additionally, similar indications can be generated at the mobile device 104, for example, by using the application program used to communicate with the wireless reader 102 and the payment system 106. The indications can be provided on the mobile device 104 using a speaker, a vibrator, and/or a display screen of the mobile device 104. Additional visual indications may be provided on the display screen of the mobile device 104 by utilizing the features of the display screen of the mobile device 104. For example, brightness, contrast, and/or color of the display screen of the mobile device 104 can be varied when displaying an indication on the display screen of the mobile device 104.

Figure 5A:
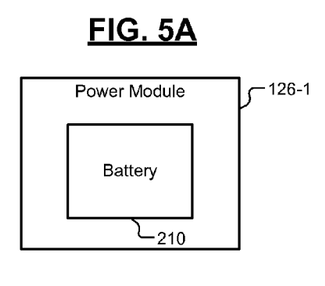
FIGS. 5A and 5B show examples of a power module that can be used to supply power to the wireless reader of FIG. 1B.
Figure 5B:
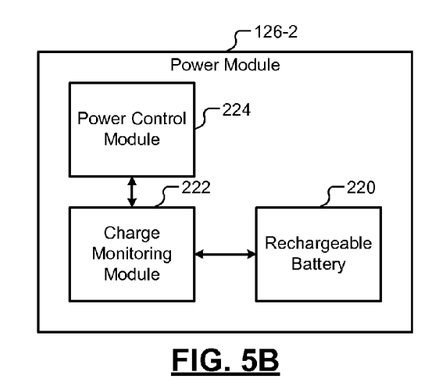

FIGS. 5A and 5B show examples of the power module 126. FIG. 5A shows the power module 126-1 that includes a battery 210 to power the wireless reader 102. FIG. 5B shows a power module 126-2 that includes a rechargeable battery 220 to power the wireless reader 102, a charge monitoring module 222, and a power control module 224. The rechargeable battery 220 can be recharged using an external power supply (not shown) that plugs into the wireless reader 102. Alternatively, the rechargeable battery 220 can be recharged by plugging the wireless reader 102 into the mobile device 104.

The charge monitoring module 222 monitors the state of charge of the rechargeable battery 220. The charge monitoring module 222 can output a signal to the indicator module 120 to indicate the state of charge of the rechargeable battery 220. The power control module 224 monitors the state of charge of the rechargeable battery 220 as indicated by the charge monitoring module 222. Additionally, the power control module 224 monitors the usage of the wireless reader 102. For example, if the wireless reader 102 is idle for a predetermined period of time, the power control module 224 lowers or shuts down the power supplied to one or more components of the wireless reader 102 and operates the wireless reader 102 in a power save mode.

Figure 6:
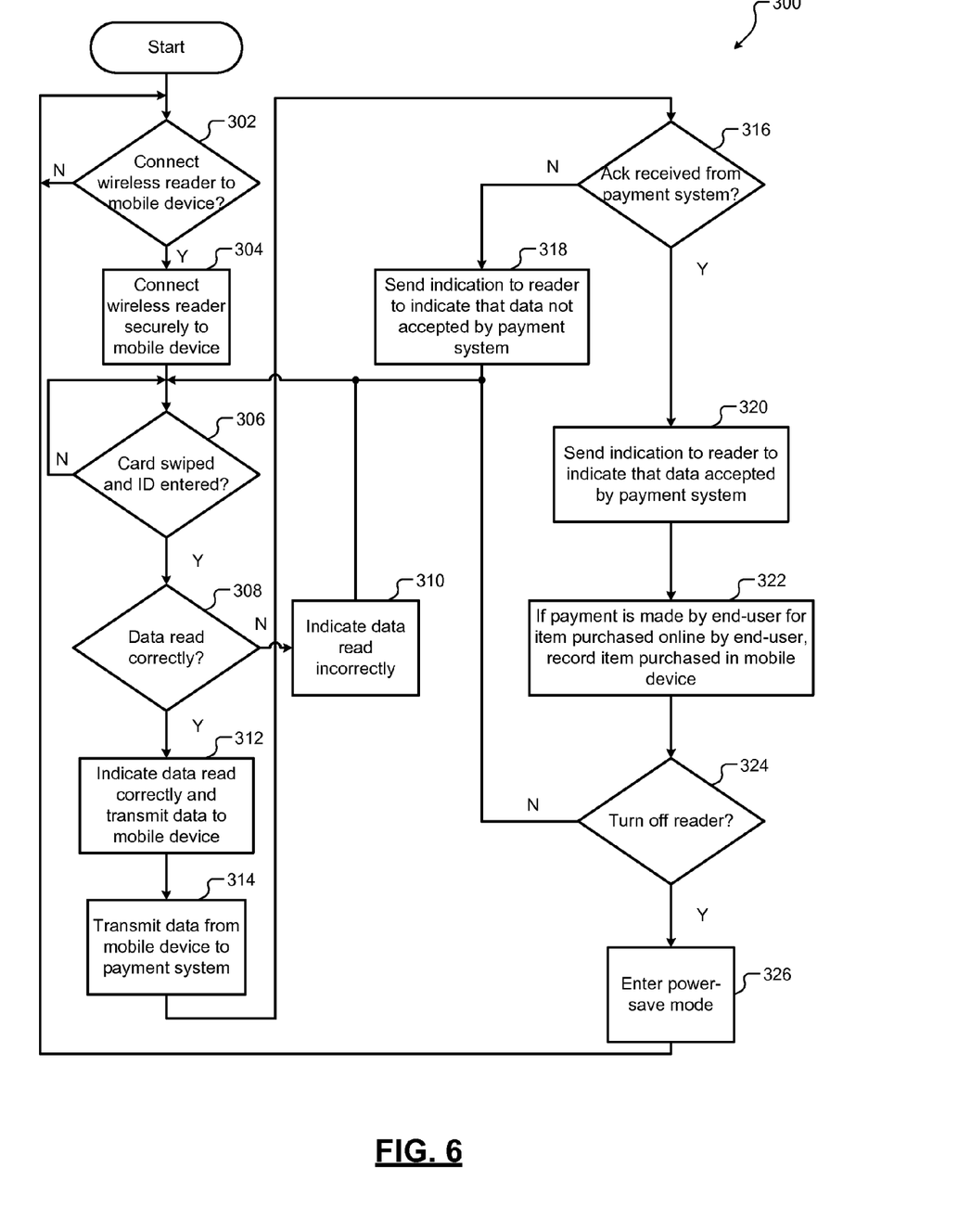
FIG. 6 is a flowchart of a method for making a payment using a wireless reader and a mobile device.

FIG. 6 shows a method 300 for making a payment using a wireless reader and a mobile device. At 302, a determination is made whether to connect the wireless reader to the mobile device (e.g., the connection would be needed to swipe a payment card to make a payment). At 304, the wireless reader is securely connected to the mobile device. At 306, a determination is made whether a payment card has been swiped through the wireless reader and whether the user has entered identification information via an input module on the reader after the payment card has been swiped. At 308, a determination is made whether the wireless reader has correctly read the information from the payment card. At 310, if the wireless reader has incorrectly read the information from the payment card, an indication of the same is made on the wireless reader, and control is returned to 306.

At 312, if the wireless reader has correctly read the information from the payment card, (i) an indication of the same is made on the wireless reader, and (ii) the data generated based on the information read from the payment card is transmitted along with the identification information to the mobile device using a wireless communication protocol (e.g., Bluetooth or Wi-Fi). At 314, the data received from the wireless reader is transmitted along with the identification information from the mobile device to a payment system.

At 316, a determination is made whether an acknowledgment is received from the payment system, where the acknowledgment indicates whether the transaction initiated by the wireless reader is approved or disapproved by the payment system. For example, the payment system 106 may approve the transaction if both the data and the identification information are correct, and may disapprove the transaction if either the data or the identification information is incorrect. At 318, if the transaction is disapproved by the payment system or if the acknowledgment is not received from the payment system, the mobile device sends an indication of the same to the wireless reader, and control is returned to 306.

At 320, if the transaction is approved by the payment system, the mobile device sends an indication of the same to the wireless reader. At 322, if the payment by swiping the card is made by an end user for an item purchased online by the end user, a record of the purchase is made in the mobile device. At 324, based on the usage of the wireless reader, whether to turn off the wireless reader is determined. Control is returned to 306 if the wireless reader is not to be turned off. At 326, if the wireless reader is to be turned off, the wireless reader is operated in a power save mode, where power supply is disconnected to a portion of the wireless reader, or less than normal power is supplied to a portion of the wireless reader, and control is returned 302.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A wireless device comprising:
    a reader configured to read information from a payment card and generate data based on the information read from the payment card;
    a verification module configured to verify, based on the data, whether the reader has correctly read the information from the payment card;
    an input module configured to allow a user to enter identifying information of the user in response to the verification module verifying that the reader has correctly read the information from the payment card;
    a security module configured to securely connect the wireless device to a mobile device using (i) a first wireless communication protocol or (ii) a second wireless communication protocol, wherein the first wireless communication protocol is different from the second wireless communication protocol;
    a transmitter configured to transmit, in response to the verification module verifying that the reader has correctly read the information from the payment card, (i) the data and (ii) the identifying information to the mobile device using (i) the first wireless communication protocol or (ii) the second wireless communication protocol, wherein the mobile device is configured to transmit (i) the data and (ii) the identifying information to a payment system;
    a receiver configured to receive from the mobile device, via (i) the first wireless communication protocol or (ii) the second wireless communication protocol, an acknowledgement received by the mobile device from the payment system, wherein the acknowledgement indicates whether the payment system has approved (i) the data and (ii) the identifying information; and an indicator configured to indicate (i) whether the reader has correctly read the information from the payment card, and (ii) whether the payment system has approved the data and the identifying information.

2. The wireless device of claim 1, wherein the reader is configured to read the information from (i) a magnetic strip, (ii) a bar code, (iii) a QR code, or (iv) a near-field communication tag associated with the payment card.

3. The wireless device of claim 1, wherein the first communication protocol includes a Bluetooth communication protocol, and wherein the second wireless communication protocol includes a Wi-Fi communication protocol.

4. The wireless device of claim 1, wherein the indicator includes one or more audio or visual indicators to indicate (i) whether the reader has correctly read the information from the payment card, and (ii) whether the payment system has approved the data and the identifying information.

5. The wireless device of claim 1, wherein the input module includes a keypad configured to allow the user to enter the identifying information including a zip code, a PIN number, or a password.

6. The wireless device of claim 1, wherein the input module includes a biometric sensor configured to sense biometric data of the user.

7. A system comprising:
the wireless device of claim 1; and
the mobile device,
wherein the mobile device is configured to operate as an intermediary between (i) the wireless device and (ii) the payment system.

8. The system of claim 7, wherein the mobile device includes an application program configured to communicate with (i) the wireless device and (ii) the payment system, and wherein the application program is configured to record in the mobile device an item purchased using the wireless device.

9. A method comprising:
reading information from a payment card using a reader arranged in a wireless device;
generating data based on the information read by the reader from the payment card;
verifying, based on the data, whether the reader has correctly read the information from the payment card;
receiving, from a user of the wireless device, identifying information of the user in response to verifying that the reader has correctly read the information from the payment card;
securely connecting the wireless device to a mobile device using (i) a first wireless communication protocol or (ii) a second wireless communication protocol, wherein the first wireless communication protocol is different from the second wireless communication protocol;
transmitting, in response to verifying that the reader has correctly read the information from the payment card, (i) the data and (ii) the identifying information from the wireless device to the mobile device using (i) the first wireless communication protocol or (ii) the second wireless communication protocol;
transmitting (i) the data and (ii) the identifying information from the mobile device to a payment system;
receiving an acknowledgement from the payment system at the mobile device, wherein the acknowledgement indicates whether the payment system has approved (i) the data and (ii) the identifying information;
receiving the acknowledgement from the mobile device at the wireless device via (i) the first wireless communication protocol or (ii) the second wireless communication protocol; and
indicating, using an indicator on the wireless device, (i) whether the reader has correctly read the information from the payment card, and (ii) whether the payment system has approved the data and the identifying information.

10. The method of claim 9, wherein reading the information includes reading the information from (i) a magnetic strip, (ii) a bar code, (iii) a QR code, or (iv) a near-field communication tag associated with the payment card.

11. The method of claim 9, wherein the first communication protocol includes a Bluetooth communication protocol, and wherein the second wireless communication protocol includes a Wi-Fi communication protocol.

12. The method of claim 9, wherein the indicating includes indicating using one or more audio or visual indicators on the wireless device to indicate (i) whether the reader has correctly read the information from the payment card, and (ii) whether the payment system has approved the data and the identifying information.

13. The method of claim 9, wherein the identifying information includes a zip code, a PIN number, or a password entered by the user via a keypad on the wireless device.

14. The method of claim 9, wherein the identifying information includes biometric data of the user sensed by a biometric sensor on the wireless device.

15. The method of claim 9, further comprising recording at the mobile device, in response to receiving the acknowledgement from the payment system, a purchase made by the reading the information from the payment card.

* * * * *